United States Patent [19]

Speich

[11] Patent Number: 5,213,003
[45] Date of Patent: May 25, 1993

[54] LOCKING DEVICE FOR AN ADJUSTABLE STEERING COLUMN ASSEMBLY

[75] Inventor: Gerald A. Speich, Warwickshire, England

[73] Assignee: The Torrington Company, Torrington, Conn.

[21] Appl. No.: 858,793

[22] Filed: Mar. 27, 1992

[30] Foreign Application Priority Data

Aug. 27, 1991 [GB] United Kingdom ............... 9118322

[51] Int. Cl.⁵ .................................. B62D 1/18
[52] U.S. Cl. ........................... 74/493; 74/527; 280/775; 403/93; 403/96; 248/287
[58] Field of Search ............. 74/493, 527, 529, 530; 280/775; 403/93, 96, 97, 98; 248/287

[56] References Cited

U.S. PATENT DOCUMENTS

| | | | |
|---|---|---|---|
| 4,244,237 | 1/1981 | Sprunger | 74/493 |
| 4,732,050 | 3/1988 | Vollmer | 74/493 |
| 5,029,489 | 7/1991 | Burmeister et al. | 74/493 |
| 5,117,707 | 6/1992 | Kinoshita et al. | 280/775 |

FOREIGN PATENT DOCUMENTS 2113629  8/1983  United Kingdom .
2240383A 7/1991  United Kingdom .

*Primary Examiner*—Allan D. Herrmann
*Assistant Examiner*—William O. Trousdell
*Attorney, Agent, or Firm*—Michael H. Minns

[57] ABSTRACT

A locking device for an adjustable steering column assembly for a vehicle has first and second interengageable disc members each being provided with toothed areas which pass through respective windows of the other disc member to engage in corresponding portions of the steering column. A spring is interposed between the two members to urge them apart which has the effect of withdrawing the toothed profiles out of engagement with the steering column assembly so that they are retracted in the windows. The invention has for its effect to facilitate free movement of a steering column in a fore and aft direction and/or up and down direction, while being able to reliably lock the column in position when desired.

20 Claims, 3 Drawing Sheets

LOCKING DEVICE FOR AN ADJUSTABLE STEERING COLUMN ASSEMBLY

BACKGROUND OF THE INVENTION

This invention relates generally to adjustable steering columns and more particularly to a locking device for an adjustable steering column assembly for a vehicle.

A problem with known adjustable steering columns is how to prevent them from moving when they are not supposed to and giving them free movement when they are supposed to, particularly in the case of steering columns that adjust up and down and fore and aft. Common systems in use rely either on simple friction clamping systems or on serrated or tooth locking mechanisms.

The common systems have a problem of giving sufficient friction to clamp, while still being able to move freely in the unlocked condition. Moreover, simple metal-to-metal systems tend to be poor in user feel and the addition of plastics such as plastics spacers tend to introduce creep and wear. Other known arrangements work on a serrated or toothed lock mechanism construction which are quite common on tilting steering columns. Such devices rely on the fixed and moving steering column parts having expensive splined teeth engaging with each other. There is a drawback that these are limited in adjustment position and are expensive.

The foregoing illustrates limitations known to exist in present adjustable steering column clamping systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a locking device for an adjustable steering column assembly, the locking device having first and second interengageable parts, at least one of the parts having a locking means for locking it against a portion of the steering column assembly, the locking means comprising an area of serrated or toothed profiles and an open area defining a window, and resilient means for urging said parts apart to bring said at least one part out of locking engagement with said portion of the steering column assembly. The locking means being arranged such that the area of serrated or toothed profiles protrudes, when the two interengageable parts are urged together, through a corresponding window in the other of said parts to engage with a corresponding area of serrated or toothed profiles provided on said portion of the steering column assembly.

The foregoing and other aspects will become apparent from the following detailed description of the invention when considered in conjunction with the accompanying drawing figures.

BRIEF DESCRIPTION OF THE DRAWING FIGURES

FIG. 1 is a schematic view of an adjustable steering column;

FIG. 2 diagrammatically illustrates a typical steering column adjusting device;

DETAILED DESCRIPTION

Figure 1:
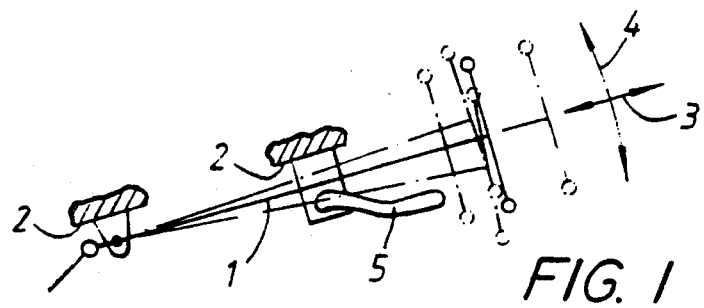

FIG. 1 schematically shows a steering column 1 with mounting points 2. The double arrows 3 show the direction of fore and aft adjustment and the double arrows 4 show the direction of up and down adjustment. A locking handle 5 is provided for the friction clamping system.

Figure 2:
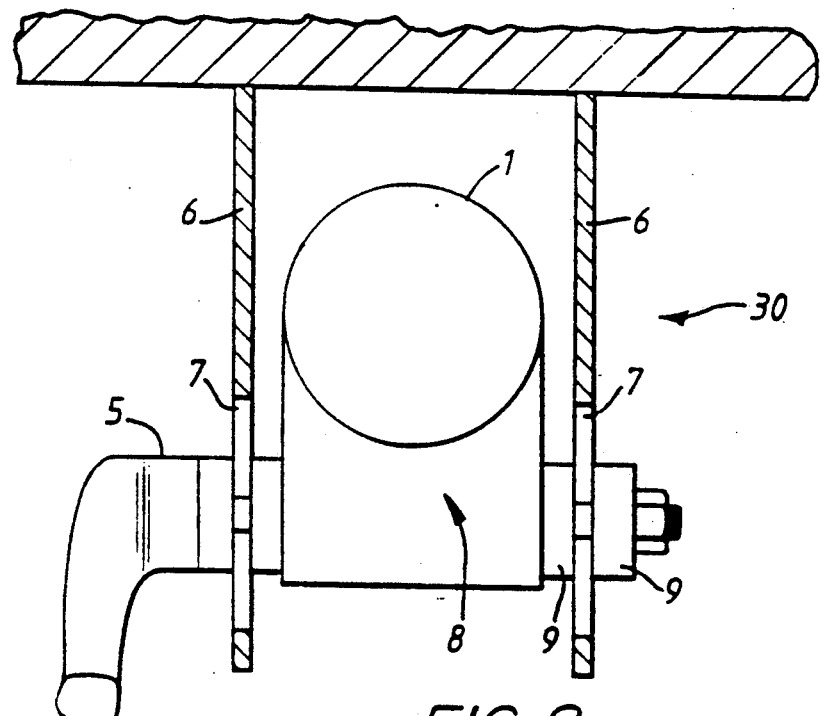

FIG. 2 diagrammatically illustrates a typical steering column adjusting device whereby the moving part of the steering column 1 is clamped inside a bracket 6 by a mechanism similar to a vice. Slots 7 are provided for vertical adjustment, while a slot is provided in the region of 8 for fore/aft adjustment.

The device shown in FIG. 2 has the problem of giving sufficient friction to clamp, while still being able to move freely in the unlocked condition. Moreover, simple metal-to-metal systems tend to be poor in user feel and the addition of plastics such as plastics spacers 9 tend to introduce creep and wear. Other known arrangements work on a serrated or toothed lock mechanism construction which are quite common on tilting steering columns. Such devices rely on the fixed and moving steering column parts having expensive splined teeth engaging with each other. There is a drawback that these are limited in adjustment position and are expensive.

According to the present invention, there is provided a locking device for an adjustable steering column assembly 30 for a vehicle, the device including first and second interengageable parts, at least one of the parts having means to lock it against a portion of the steering column assembly and resilient means to urge said parts apart to bring said at least one part out of locking engagement with said portion.

Preferably, both of said parts have means to lock each of them against separate portions of the steering column assembly, so that the resilient means urges both of the parts out of locking engagement.

Figure 3:
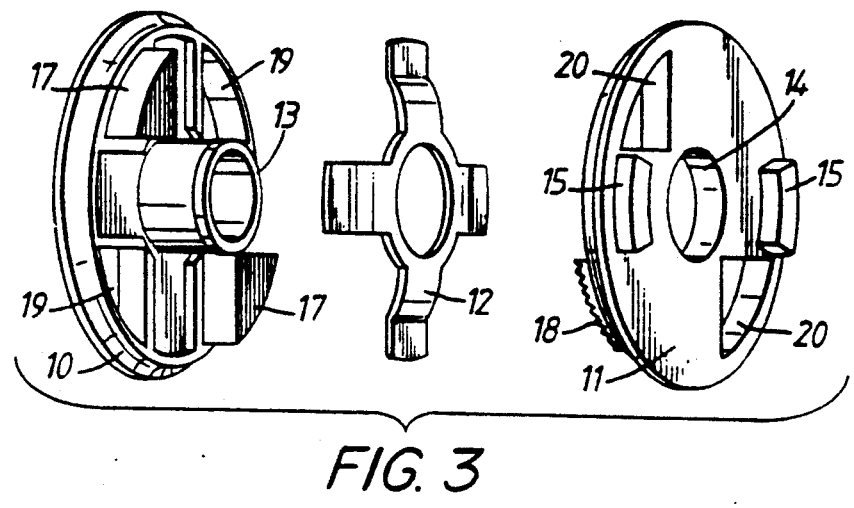
FIG. 3 is an exploded view of illustrating the two interengageable parts and the resilient means of the locking device.
Figure 4A:
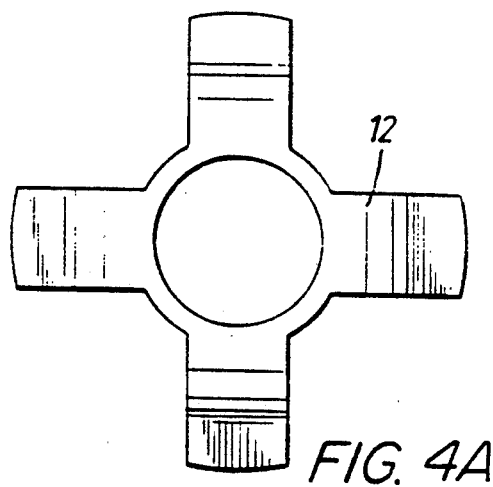
FIGS. 4A and 4B are a plan view and side view of the resilient means shown in FIG. 3.
Figure 4B:
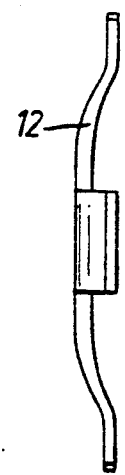

Referring to FIG. 3, the first and second interengaging parts comprise an outer lock disc member 10 which interengages with an inner lock disc member 11. The resilient means in the form illustrated is a separate, cross-shaped leaf spring 12 interposed between the two disc members 10, 11 and located in respective spring seats 10A, 11A in the disc members. The disc members 10, 11 and the spring 12 can be made of plastics material or metal as preferred.

The disc member 10 is provided with a nose 13 which locates the spring 12 and snaps through a central aperture 14 in the disc member 11 to hold the assembly together. This may be further extended to guide the device in its mating part.

Figure 9:
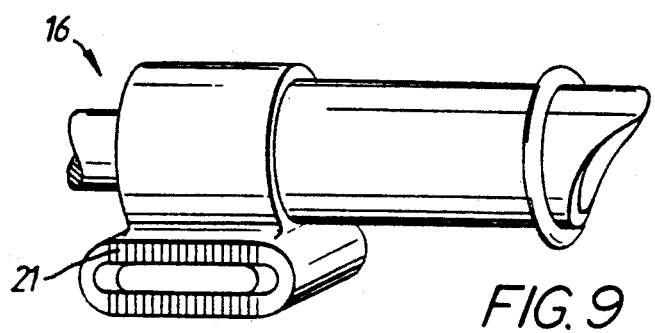
FIG. 9 is a schematic view showing a portion of the steering column assembly against which one of the parts is intended to lock.
Figure 5A:
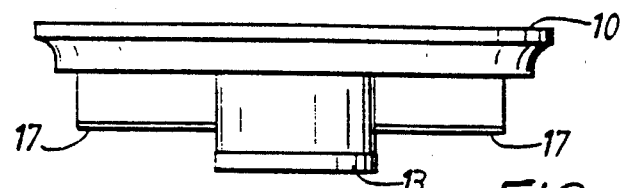
FIGS. 5A and 5B are a plan view and front view of one of the interengageable parts.
Figure 5B:
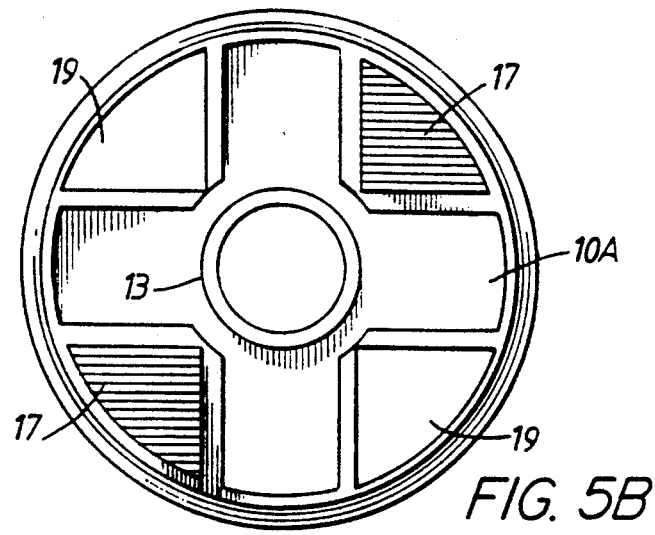
Figure 6A:
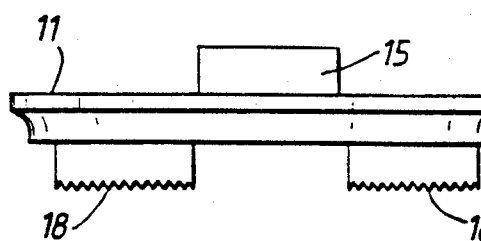
FIGS. 6A and 6B are a plan view and front view of the other of the interengageable parts.
Figure 6B:
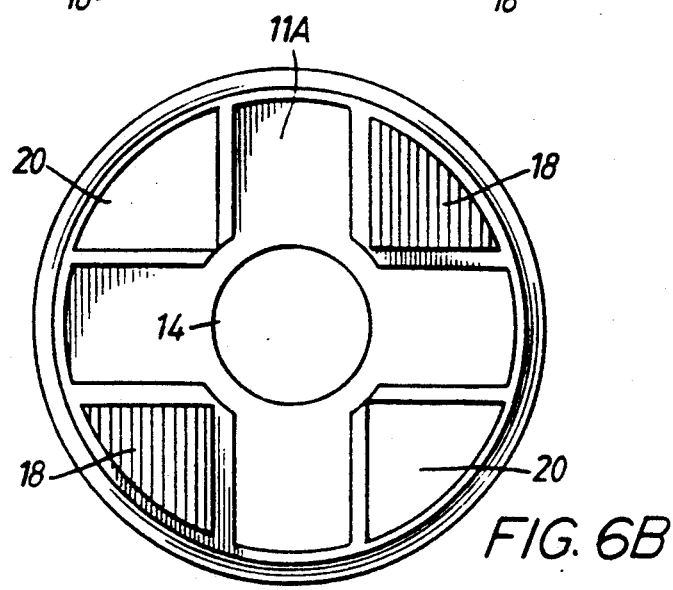

Means in the form of protrusions 15 on the face of the disc member 11 which faces away from the disc member 10 are provided to act as a guide to locate the disc member 11 in a slot such as the slot 7 or 8 of the steering column mounting bracket 6 or in the mating steering column inner part 16 shown in FIG. 9.

In the form illustrated, each disc member 10, 11 is provided with two areas of serrated or toothed profiles 17, 18, respectively. Each disc member 10, 11 is also provided with a pair of corresponding windows 19, 20, respectively, through which the toothed profiles of the other disc member can protrude when the two disc members are urged towards one another, the two disc members having perpendicularly opposed toothed areas.

Figure 7:
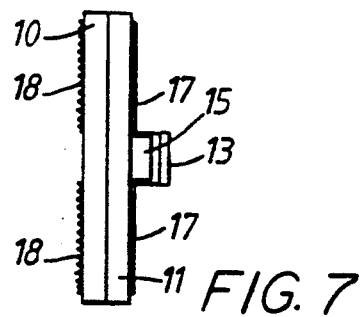
FIG. 7 is a side view of the two interengageable parts in a locking condition.
Figure 8:
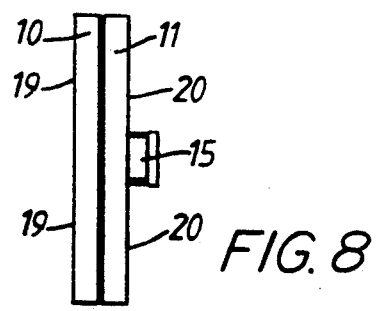
FIG. 8 is a view similar to FIG. 7 showing the two parts out of the locking condition.

FIG. 7 shows the disc members in a condition where the resilient bias of the spring 12 has been overcome while FIG. 8 shows the condition where the spring 12 has been allowed to push the disc members 10 and 11 apart, thereby retracting the toothed areas 17, 18 into the windows 19, 20 respectively.

The locking device is fitted between part of the steering column assembly such as the bracket 6, which is provided with a toothed area corresponding to the toothed areas 18, for example, while the steering column inner part 16 is provided with a toothed form such as that shown at 21 with which the toothed areas 17 can engage.

In use, with the clamping handle 5 in an unlocked condition, it will be seen that the locking device offers a smooth face to slide against and, in the locked condition of the clamping handle 5, offers a toothed profile on both sides which engages into the bracket and the moving part to prevent further movement, the clamping force exerted across the steering column compressing the spring 12 so that the toothed profiles protrude through the windows beyond both outer sides of the disc members to engage in the similar teeth pressed into the bracket sides (in the case where there is a slot provided for vertical adjustment) and into teeth, which may have been cast, into the side of a slot on the moving member for fore and aft adjustment.

The teeth need only protrude through the windows by 0.5–1.0 mm, which then requires a minimum free play when unlocked of 1 mm. Angular mismatch of the two slots for the two types of adjustment can be absorbed by permissible rotational movement between the two disc members.

The width of the locking device need only be about 5.5 mm, while the disc members can have a diameter of 30 mm but it will be appreciated that they can be of any thickness or shape to suit the particular application.

Instead of the leaf spring 12, the resilient means could be integral with one or other of the first and second interengageable parts.

A groove (not shown) could also be incorporated in the outside diameter of the device to locate a column support spring which prevents the column from dropping when unlocked.

A device of this type needs a guide 13 to locate it correctly with respect to its slot. This is also used as a snap fit to retain the three components, namely the parts 10, 11 and 12, together. The two further supports 15 can be used to stop relative rotation between the device and mating slots to ensure correct angular orientation of the toothed profiles 17, 18 with their respective mating toothed profiles.

Having described the invention, what is claimed is:

1. A locking device for an adjustable steering column assembly for a vehicle, the locking device comprising:

first and second interengageable parts, at least one of the parts having a locking means for locking it said at least one part against a portion of the steering column assembly, the locking means comprising an area of serrated or toothed profiles and an open area defining a window;

resilient means for urging said parts apart to bring said at least one part out of locking engagement with said portion of the steering column assembly; and the locking means being arranged such that the area of serrated or toothed profiles on one of the first and second interengageable parts protrudes, when the two interengageable parts are urged together through a corresponding window in the other of said first and second interengageable parts to engage with a corresponding area of serrated or toothed profiles provided on said portion of the steering column assembly.

2. The locking device according to claim 1, wherein both of said parts have locking means to lock each of them against separate portions of the steering column assembly and the resilient means urging both of the parts out of locking engagement.

3. The locking device according to claim 1, wherein said resilient means is interposed between the two parts.

4. The locking device according to claim 3, wherein said resilient means is a leaf spring.

5. The locking device according to claim 4, wherein said leaf spring is cross-shaped.

6. The locking device according to claim 1, wherein said resilient means is integral with one of said parts.

7. The locking device according to claim 1, wherein at least one of said parts is provided with guide means for locating that part in another portion of the steering column assembly.

8. The locking device according to claim 1, wherein each said part is in the form of a disc member.

9. The locking device according to claim 1, wherein each said part is provided with a seat for said resilient means.

10. A locking device for an adjustable steering column assembly for a vehicle, the locking device comprising:

first and second interengageable parts, each part having a locking means for locking said part against a portion of the steering column assembly, the locking means comprising a plurality of areas of serrated or toothed profiles and a plurality of open areas defining windows;

a resilient means for urging said parts apart to bring said parts out of locking engagement with the portions of the steering column assembly, said resilient means being located between said parts; and the locking means being arranged such that the areas of serrated or toothed profiles protrude, when the two interengageable parts are urged together, through corresponding windows in said parts to engage with corresponding areas of serrated or toothed profiles provided on the portions of the steering column assembly.

11. The locking device according to claim 10, wherein said resilient means is a leaf spring.

12. The locking device according to claim 11, wherein said leaf spring is cross-shaped.

13. The locking device according to claim 10, wherein said resilient means is integral with one of said parts.

14. The locking device according to claim 10, wherein at least one of said parts is provided with means to act as a guide to locate that part in another portion of the steering column assembly.

15. The locking device according to claim 10, wherein each said part is in the form of a disc member.

16. The locking device according to claim 10, wherein each said part is provided with a seat for said resilient means.

17. A locking device for an adjustable steering column assembly, the locking device comprising:
   a pair of disc members, each disc member having a plurality of toothed areas and a plurality of apertures, each toothed area being located between apertures, the disc members being arranged relative to one another such that a toothed area on one disc member is aligned with an aperture on the other disc member, the toothed areas of one disc member extending through the apertures of the other disc member when the disc members are urged together, the toothed areas engaging the steering column assembly.

18. The locking device according to claim 17, further comprising a resilient means for urging the disc members apart to bring the toothed areas out of engagement with the steering column assembly.

19. The locking device according to claim 18, wherein the resilient means is a cross-shaped leaf spring interposed between the disc members.

20. The locking device according to claim 18, wherein the resilient means is integral with one of the disc members.

* * * * *

UNITED STATES PATENT AND TRADEMARK OFFICE
CERTIFICATE OF CORRECTION

PATENT NO. : 5,213,003
DATED      : May 25, 1993
INVENTOR(S): Gerald A. Speich

It is certified that error appears in the above—identified patent and that said Letters Patent is hereby corrected as shown below:

In Claim 1, column 4, line 7 of the Patent, delete "it"

Signed and Sealed this

Sixteenth Day of August, 1994

Attest:

BRUCE LEHMAN

Attesting Officer     Commissioner of Patents and Trademarks